United States Patent [19]

Nilson

[11] 4,065,033
[45] Dec. 27, 1977

[54] TUBE CONTAINER

[75] Inventor: Billy N. Nilson, Mjolby, Sweden

[73] Assignee: KeNova AB, Malmo, Sweden

[21] Appl. No.: 564,551

[22] Filed: Apr. 2, 1975

[30] Foreign Application Priority Data

Apr. 26, 1974 Sweden .............................. 7405618

[51] Int. Cl.² ............................................ B65D 35/12
[52] U.S. Cl. ......................................... 222/107; 220/67
[58] Field of Search .................... 222/92, 107; 220/67, 220/339

[56] References Cited

U.S. PATENT DOCUMENTS

| 1,188,115 | 6/1916 | Thompson | 222/107 |
| 2,535,837 | 12/1950 | Coyle | 222/92 X |
| 3,158,110 | 11/1964 | Ross | 222/107 X |
| 3,866,790 | 2/1975 | Marion et al. | 220/67 |
| 3,907,193 | 9/1975 | Heller | 220/339 X |

FOREIGN PATENT DOCUMENTS 1,106,499  3/1968  United Kingdom ................ 222/107

Primary Examiner—Robert B. Reeves
Assistant Examiner—Charles A. Marmor
Attorney, Agent, or Firm—Finnegan, Henderson, Farabow & Garrett

[57] ABSTRACT

A tube container comprises a tubular member having one end thereof flanged inwardly to form an internal flange facing the opposite end of said tubular member and a discharge member, provided with a thin annular flange diverging in the discharge direction of the tube container, such that its maximum dimension exceeds the inner dimension of the tubular member. The discharge member is inserted in the tubular member such that the annular flange thereof is located in the space between the outer wall of the tubular member and the internal flange thereof.

6 Claims, 7 Drawing Figures

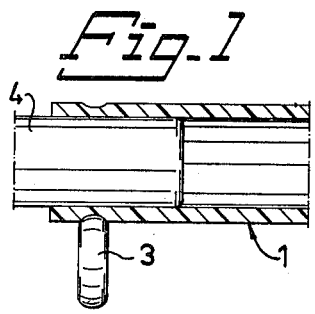
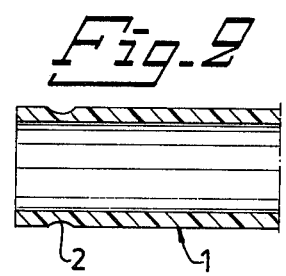
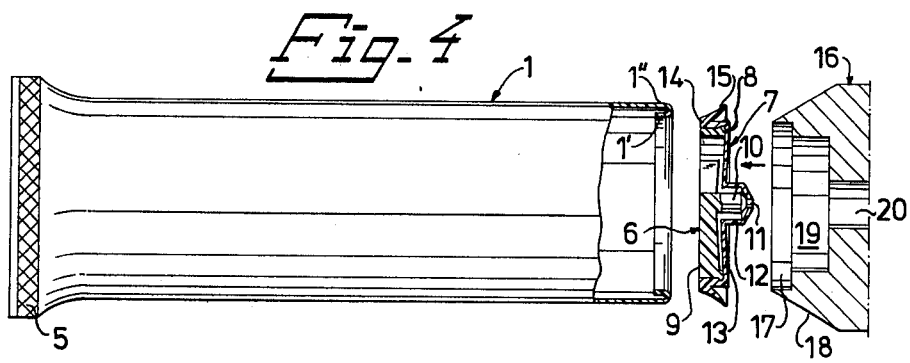
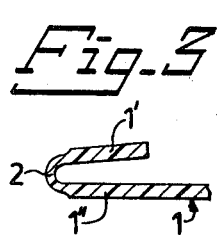
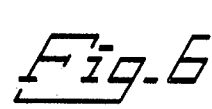
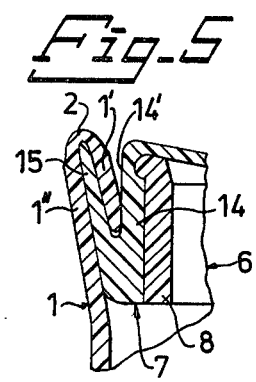
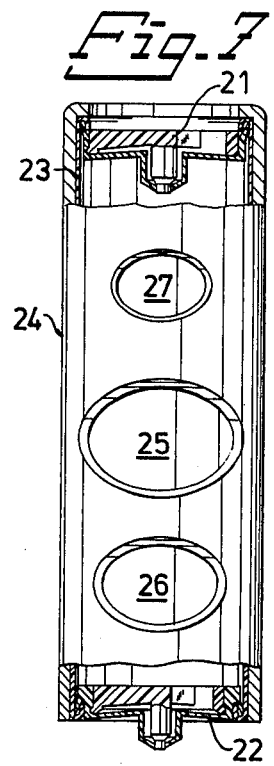

TUBE CONTAINER

This invention refers to a tube container and more particularly to a tube container continuing a tubular member and a closure member. In manufacturing plastic tube containers a thin tube or hose is cut into pieces of appropriate length and such tube pieces are thereupon provided with so-called tube breasts by introducing one end of said tube piece in the mold in which the tube breast is molded. The still open end of the tube piece is finally closed by means of a welding operation. This known method is relatively expensive. Additionally, in manufacturing of tube containers with self-closing closures having a diaphragm which is intended to uncover a discharge opening in response to a pressure exerted upon the content of the tube container, it is of utmost importance that the closure be connected to the tube piece in such a manner that the diaphragm of the closure will not be negatively influenced by the deformation of the tube container which takes place when the tube container is squeezed to effect discharge of tube content. In conventional tube containers the tube breast tends to be oval even when a moderate pressure is exerted upon the package. Still another disadvantage inherent in the conventional method is that the tube container cannot be filled from its discharge end and that consequently the welding of the tube must take place at the factory where the filling takes place. One object of the invention is to overcome the disadvantages referred to and in order to achieve this and other objects the invention is carried out according to the claims.

In the accompanying drawing some exemplary embodiments of the invention are illustrated and FIG. 1 shows schematically and in section through the tube piece a first step in the manufacturing of a tube according to the invention, FIG. 2 is a section through one end of the tube piece after the operation according to FIG. 1.

FIG. 3 illustrates in section and on an enlarged scale one end of the tube piece after a flanging operation.

FIG. 4 shows partly in section a tube piece, a self-closing closure and a tool for securing the self-closing closure to the tube piece.

FIG. 5 shows on an enlarged scale a section through one end of a tube piece with the closure, connected thereto.

FIG. 6 illustrates the final tube container, and

FIG. 7 illustrates a modified tube container having air sucking means as well as a sleeve to effect predetermined discharge volumes.

FIGS. 1 - 4 inclusive illustrate a new method for producing tube containers. Similar to conventional tube container manufacturing extruded hoses or tubes made from suitable material such as plastic are cut to pieces of desired lengths. Such a tube piece is generally designated 1. The first step in the manufacturing sequence is to provide the tube piece with an annular portion 2 having a reduced wall thickness as appears from FIG. 2. This reduction of the wall thickness may be provided by means of recess turning of according to FIG. 1 in that a rotatable roller 3 is pressed against the tube piece 3 when the latter is positioned over a rotating mandrel 4. The end portion 1' thus generated is thereupon flanged inwards such that said portion 1' will be located inside the tube and directed obliquely towards the end of the tube which is opposite to its discharge opening. The portion of the tube piece which will then be located outside said portion 1' will hereinafter be designated 1".

FIG. 4 shows the parts of the tube, as well as a tool, separated from each other. One end of the tube piece is closed by means of flattening and welding along the zone 5. In some applications it may be suitable to use tube pieces having a double length and to cut the tube piece in the middle portion thereof after having welded the tube pieces along two zones 5 located at each side of the intended cutting line.

The closure illustrated in FIG. 4 is as mentioned self-closing but it should be noted that this invention is not restricted to closures of this type but may be applicated to conventional tube breasts having a threaded portion for a cap as well as for other types of discharge constructions. The closure illustrated in FIG. 4 comprises two parts 6, and 7 which are connected to each other in their outer portions. The part 6 has an annular part 8 which by means of radially extending spokes 9 is connected to a centrally disposed closure post 10 the free end of which being intended to sealingly cover a discharge opening 11 provided in the part 7. As appears from the drawing the discharge opening is provided in the end portion of a sleeve-shaped part 12 which continues in a diaphragm 13 which in its turn continues in an annular part 14 which embraces the annular part 8 of the part 6. The diaphragm slopes in its active position inwardly and thus forms a negative angle whereas it has a positive angle in the discharge position thereof. The closure now described is already known.

According to this invention the closure is however provided with an annular thin flange 15 which extends from the annular part 14 and diverges in the discharge direction and preferably has a section which successively diminishes towards the free end thereof such that it also may act as a lip seal. The part 14 has a diameter which is slightly less than the inner diameter of the tube while the thin flange 15 has a maximum diameter exceeding the inner diameter of the tube. This design makes it possible to press the closure into the tube piece for instance by means of the simple tool 16 illustrated in FIG. 4. The tool has an inturned portion 17 for the part 14 and an outer bevelled surface 18 which is intended to be received in the space between the part 14 and the flange 15 and which preferably continues with the same conicity. The tool has of course also a recess 19 which may house the projecting part 12 of the closure and it also has an air escape hole 20.

It is obvious that the connection of the closure may be carried out in a very simple manner by positioning the closure on the left hand part of the tool and then moving the tool in the direction of the arrow to bring the closure into said tube piece such that the flange 15 of said closure snaps in behind the folded in portion 1'. At the insertion in the tube piece the flange 15 is deformed such that it may pass the tube opening but when it passes the portion 1' the flange springs out such that it resiliently contacts the inner tube wall. When the flange thereupon — in the manufacturing procedure or when a pressure exerted upon the tube content causes the closure to be displaced in the discharge direction of the tube - reaches the space between the tube portions 1' and 1" the connection part 14 which preferably is slightly bevelled has come into contact with the portion 1' and exerts a wedge action upon the same. The flange is sealingly housed between the parts 1' and 1". The thin tube material will then be deformed as appears from FIG. 5 and the closure will be safely fixed in the illustrated position at the same time as a labyrinth sealing is obtained between the parts 1", 15, 1' and 14. The parts thus deform each other in the radial direction and a cheap and leakproof connection has been achieved.

It is obvious that the tube is preferably filled before the connection of the closure and that consequently the tube pieces may be delivered in their welded condition to the factory in which the tubes are to be filled. As previously mentioned the operations for producing the tube container may be arranged in other sequences an it may also be pointed out that the closure may be pressed into the tube piece from the normally closed end of the tube provided of course that the welding operation is carried out afterwards.

The method now described may also be used for producing tube containers of for instance the design shown in FIG. 7. This tube container is different from that according to FIG. 6 in that the both free ends of the tube piece are used to hold self-closing closures of the kind just described. One of these closures 21 is then so located that it opens in the same direction as the closure 22 at the opposite end of the tube. By this arrangement one closure will close when the other will open and vice versa. When such a tube container is used as a conventional tube container air will be sucked into the tube every time a discharge takes place. Thus the tube container is not successively flattened. The tube container according to FIG. 6 is of course successively flattened as no air is sucked into it.

The arrangement of two closures which open in the same direction but are connected to opposite ends of a tube bring forth a number of advantages and possibilities but with reference to FIG. 7 a tube container having a measured discharge will now be described. To this end a tube container of this character and generally designated 23 is surrounded by a relatively rigid sleeve 24 which in the illustrated embodiment has in its envelope surface a relatively large opening 25, a medium size opening 26 and a small opening 27. By inserting the thumb in the first-mentioned opening the tube container is collapsed to a relatively great extent and as a consequence thereof a relatively big amount of tube content will be discharged. By inserting the thumb in the medium sized opening 26 a correspondingly reduced amount will be discharged and by inserting the thumb in the small opening 27 a still reduced amount of tube content will leave the tube container each time the thumb exerts a pressure upon the tube wall. In this simple manner a relatively accurate measurement may be achieved and different amounts, for instance 1, 2 or 3 volume units may be achieved by merely choosing the correct opening for the thumb.

The inner flange 1' of the tube piece may have an axial extension corresponding to that of flange 15 such that the free end of said flange will be in contact with the wall portion which connects the flange 1' and the portion 1" the free end of flange 1' also being in contact with the wall portion which connects the flange 15 and the part 14.

What I claim is:

1. A container comprising a tubular member having a first end and a second end, the first end of said tubular member folded inwardly to form a first annular flange at said first end directed toward said second end and defining a first annular space between said first annular flange and said tubular member, a discharge member attached to said tubular member at said first end and being designed to dispense the contents of the container, said discharge member having a peripheral portion with a resilient second annular flange formed thereon having an outer lip portion of unflexed maximum diameter greater than the inner diameter of said tubular member directed toward said first end of said tubular member and defining a second annular space between said resilient annular flange and said discharge member, said resilient annular flange of said discharge member being in resilient contact with the inner surface of said tubular member and with said lip portion sealingly retained in said first annular space, and said first annular flange of said tubular member being retained in said second annular space.

2. A container as claimed in Claim 1 wherein the outer surface of said resilient second annular flange has a generally conical shape in that it diverges outwardly from the circumference of said discharge member in a direction toward said first end of said tubular member.

3. A container as claimed in claim 1 wherein the lengths of the two flanges along the longitudinal axis of the tubular member are approximately the same such that the flange of each of said members will be in contact with the other member within the respective annular space in which each such flange is retained.

4. A container as claimed in claim 3 wherein the peripheral portion of said discharge member is an annular wall, said second annular flange projecting from said annular wall and said second annular space being formed between said second annular flange and said annular wall, and the flange of each of said members being retained in the annular space of the other member by a friction fit.

5. A container as claimed in claim 4 wherein said tubular member has an annular zone of reduced thickness where the first end is folded to form said first annular flange.

6. A container as claimed in claim 4 wherein said second end of said tubular member is sealed, and said discharge member comprises self-closing closure means for opening in response to pressure applied to the contents of the container and for closing upon the release of pressure.

* * * * *